United States Patent [19]
Hummel et al.

[11] Patent Number: 6,039,780
[45] Date of Patent: Mar. 21, 2000

[54] FILTER ARRANGEMENT

[75] Inventors: Karl Ernst Hummel, Bietigheim-Bissingen; Helmut Luka, Kornwestheim; Bruno Sommer, Ludwigsburg, all of Germany

[73] Assignee: Filterwerk Mann & Hummel GmbH, Ludwigsburg, Germany

[21] Appl. No.: 09/091,550

[22] PCT Filed: Dec. 17, 1996

[86] PCT No.: PCT/EP96/05664

§ 371 Date: Sep. 2, 1998

§ 102(e) Date: Sep. 2, 1998

[87] PCT Pub. No.: WO97/23271

PCT Pub. Date: Jul. 3, 1997

[30] Foreign Application Priority Data

Dec. 22, 1995 [DE] Germany ............................ 195 48 180

[51] Int. Cl.[7] .......................... B01D 39/02; B65D 65/00
[52] U.S. Cl. .................................. 55/502; 55/513; 55/518; 55/519; 55/524; 210/282; 210/290; 210/484; 210/489; 210/504; 206/497; 264/645
[58] Field of Search ................................ 55/502, 490, 512, 55/515, 524, 322, 513, 514, 516, 518, 519; 210/232, 282, 283, 290, 484, 489, 490, 492, 503, 504; 206/497; 264/645

[56] References Cited

U.S. PATENT DOCUMENTS

| | | |
|---|---|---|
| 2,328,381 | 8/1943 | Jaffe . |
| 3,568,416 | 3/1971 | Staunton . |
| 3,573,158 | 3/1971 | Pall et al. . |
| 3,785,497 | 1/1974 | Giffard . |
| 4,064,876 | 12/1977 | Mulchi . |
| 4,119,019 | 10/1978 | Reid . |
| 4,723,542 | 2/1988 | Giffard . |
| 4,790,306 | 12/1988 | Braun et al. . |
| 5,364,458 | 11/1994 | Burnett et al. . |
| 5,397,632 | 3/1995 | Murphy, Jr. et al. . |
| 5,478,379 | 12/1995 | Bevins . |
| 5,662,728 | 9/1997 | Groeger . |

*Primary Examiner*—Duane Smith
*Assistant Examiner*—Fred Prince
*Attorney, Agent, or Firm*—Evenson, McKeown, Edwards & Lenahan, P.L.L.C.

[57] ABSTRACT

A filter arrangement with a cellular structure in which a plurality of filter chambers extend in the direction of the medium to be filtered. There is a filter cloth or fabric attached to each of the two sides of a cell frame which closes the filter chambers on both sides. The filter chambers are each provided with a filling of predominantly active charcoal granules. To achieve a simple and advantageous structure of the filter arrangement, the cellular structure is in the form of a rectangular cell frame each with rectangular filter chambers, preferably made of synthetic resin. Appropriate, right-angled partition walls inside the cell frame and the installation of reinforcement members can result in filter chambers of optimum size.

16 Claims, 2 Drawing Sheets

FILTER ARRANGEMENT

The invention relates to a filter arrangement with a plurality of filter chambers, according to the preamble of the main claim.

STATE OF THE ART

A filter arrangement having a plurality of filter chambers with a rectangular cellular frame is disclosed in GB 2,298, 053 B, wherein the filter chambers are each filled with active charcoal. The cellular structure of these filter chambers is a honeycomb structure which is made either of pressed paper, of cellulose or of metal. On both sides of this honeycomb structure, a permeable filter sieve which is permeable to the medium to be filtered is adhered with the active charcoal included. For adhesion, the end faces of the honeycomb structure have a liquid adhesive applied thereto which hardens after the respective filter sieve is set in place.

A disadvantage of the known honeycomb structure is its relatively expensive manufacture, since as a rule it can be made only in one piece, and in the marginal area of the honeycomb structure it necessarily results in changes in the size of the filter chambers. Because in most applications a smooth cell frame is necessary, since the entire filter arrangement must be inserted into another apparatus, the filter chambers at the margins a substantially smaller passage surface area in order to straighten out the chambers. In addition to the extra cost of manufacture, the throughput of the medium to be filtered is in this case distributed non-uniformly.

OBJECT OF THE INVENTION

It is the object of the invention to provide a filter arrangement that is easy to manufacture and forms an optimum passage surface for the medium to be filtered.

ADVANTAGES OF THE INVENTION

The filter arrangement of the kind referred to in the beginning is advantageously further developed by the invention in that a cellular frame can be provided in a simple manner with intermediate walls, so that rectangular or square filter chambers are formed. The filter chambers in the case of a given height of the cellular frame are dimensioned so that a volume of the active charcoal granules can be loaded into it that will be favorable to the filtering process.

Since the rectangular cell frame with its intermediate partition walls can be formed of synthetic resin grids that may already be standardized, it is possible to press or fuse the filter fabric for the enclosure of the active charcoal in the filter chambers, in an at least partially fitted manner under the influence of heat onto the faces of the cell frame and partition walls. For this purpose, the filter fabric is preferably made from a polyester sieve fabric. After the cell frame and the partition walls are joined to the first filter fabric, the active charcoal is filled into the filter chambers and enclosed by the attachment of the second filter fabric as described above.

An optimum filtering action can be achieved advantageously by a layered arrangement of different granules, since in its direction of the flow the medium to be filtered can pass through a succession of granular structures adapted to the particular particles to be removed.

In another advantageous embodiment it is also possible to produce the cell structure in such a way that the filter fabric is initially introduced into a corresponding mold and then the cell frame with the partition walls is subsequently formed thereon by a plastic injection molding process.

A secure and strong enclosure of the active charcoal granules can be achieved in a simple manner after the introduction (filling) of the charcoal granules by the shrinking, as defined in the dependent claims, of bulges created in at least an outer filter sieve by embossing or by the filling.

It has proved to be especially advantageous to make the size of the passage surface of the individual cells to be about 400 $mm^2$ or slightly less. The active charcoal granules preferably have a grain size of about 8×12, and can also be mixed additionally with polyurethane foam or other resilient plastic particles. By the admixture of the plastic particles a permanent bias (prestress) can be produced in the granules which prevents any separation of the active charcoal particles as well as noise caused by their movement. Also, the resistance to flow and the adsorptive property of the filter arrangement can be positively influenced by an appropriate mixture and a possibly modified size of the active charcoal granules.

By the additional use of a tension anchor as a reinforcing element according to one of the dependent claims, it is advantageously possible for the filter chambers to be enlarged up to four times the size referred to above. This eliminates a number of partition walls in a filter arrangement of the same external size, thereby increasing the total filter volume. The tension anchor can be fastened in a simple manner by a cross-shaped mount or support on the bottom of the filter chamber. Alternatively, the subsequent insertion of a rod or rivet as a tension anchor is possible, which can be pushed through at least one filter fabric and be held thereon.

Other advantageous embodiments are described in the further dependent claims.

BRIEF DESCRIPTION OF THE DRAWINGS

The invention will be explained with reference to a working embodiment illustrated in the drawing in which.

DESCRIPTION OF THE EMBODIMENTS

Figure 1:
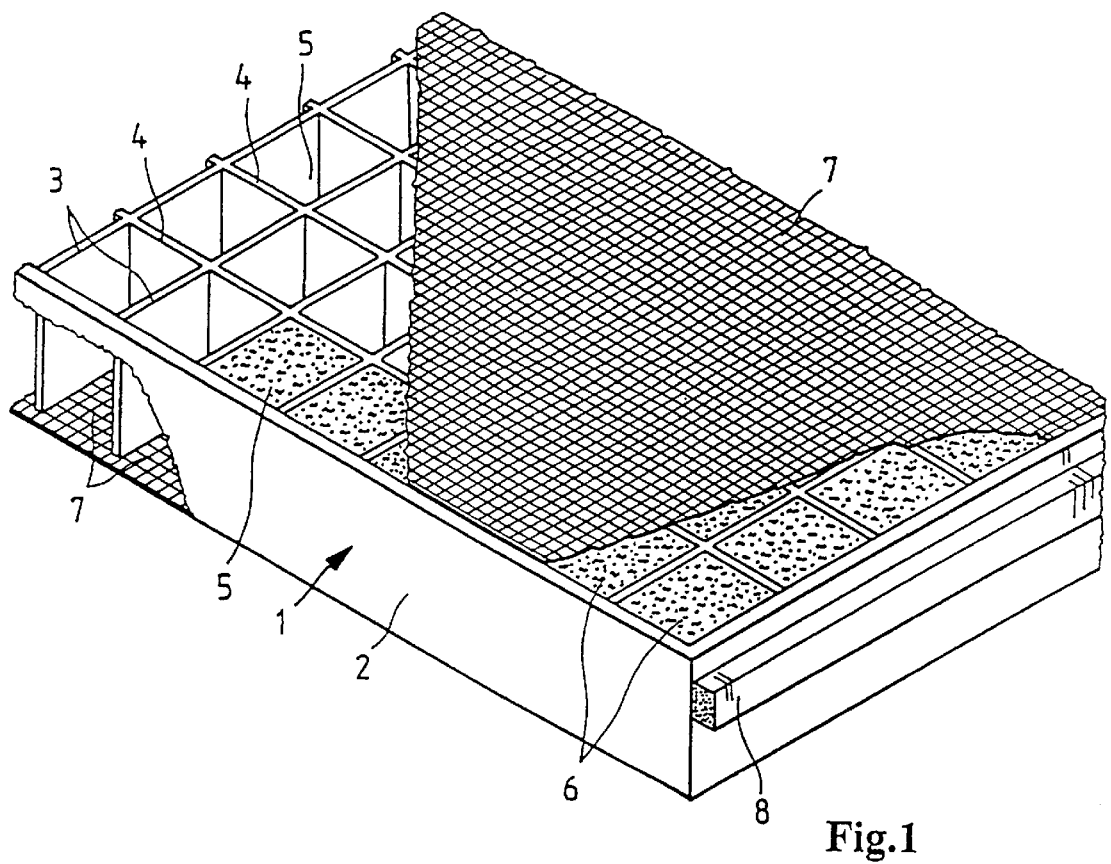
FIG. 1 is a view of a filter arrangement with filter chambers.

FIG. 1 shows a filter arrangement 1 which comprises a rectangular cell frame 2 with partition walls 3 and 4 of synthetic resin (polypropylene, for example). The partition walls 3 and 4 as well as in the outer part of the cell frame 2 form filter chambers 5 which are filled with granules 6 of active charcoal, admixed in some cases with polyurethane foam or other pieces of synthetic resin. The filter chambers 5 can be filled with a mixture of active charcoal granules 6 having different compositions and a substantially uniform particle size. In addition, the active charcoal granules 6 may be impregnated with an impregnating agent. The filter chambers 5 are closed off on both sides by a filter fabric 7, for example, a polyester sieve fabric.

In the illustrated embodiment, the filter fabric 7 can be installed in this embodiment by pressing it under the influence of heat into the end faces of the partition walls 3 and 4 as well as the cell frame 2. In an alternative method of manufacture the cell structure 2, 3, 4 is injection molded onto the first filter fabric 7. After the formation of the initially open filter chambers 5, the active charcoal granules and the admixture if any are put into them, and then the cell frame 2 is closed off with the second filter fabric 7 in the same manner as described above.

On the outside of the cell frame 2 a gasket 8 is added, which upon the insertion of the filter arrangement 1 into an apparatus, seals the filter arrangement in such a way that no bypass of the medium will occur.

Figure 2:
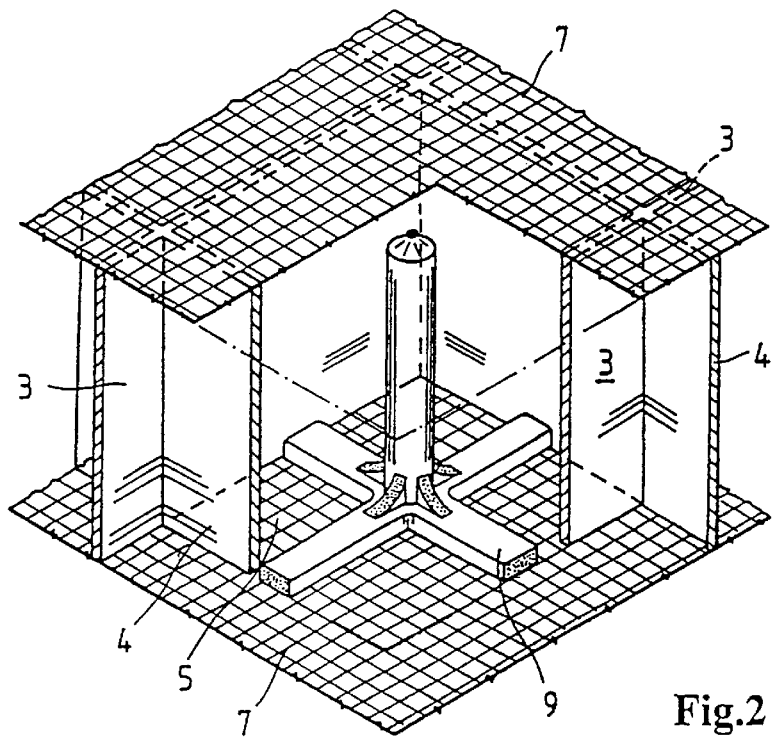
FIG. 2 is a detail view of a filter chamber with a tension anchor as a reinforcing element.

In FIG. 2 there is shown a detail of a filter chamber 5 in the interior of which a reinforcing element 9 is introduced which assures a mechanical stabilization of the active charcoal granules and of the optional admixture. The reinforcing element 9 can be constructed, for example, in the form of a tension anchor which is held by a cross support on the bottom of the filter chamber 5. Other alternatives are possible; for example, the reinforcing element 9 can be in the form of a pin or rivet and extend possibly only between some of the walls or corners of the filter chamber 5. In this case, for example, the filter fabrics 7 could be penetrated in order to fasten the reinforcing element 9.

Figure 3:
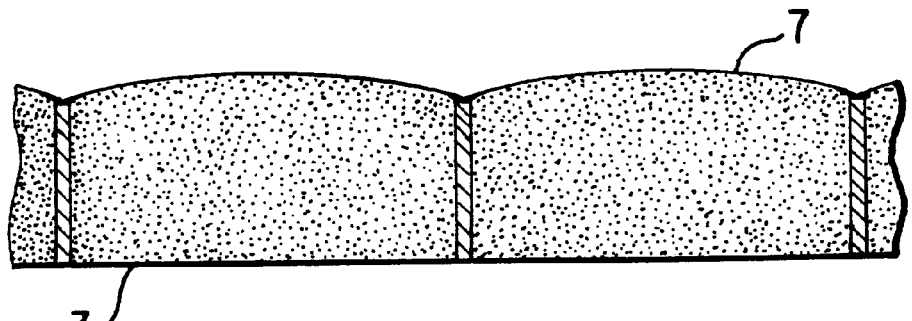
FIG. 3 is a detail of a pre-embossed outer filter sieve.

In the embodiment of a filter arrangement according to FIG. 3, the outer filter fabric 7 can be domed or bulged and applied to the cell frame 2 with the partition walls 3 and 4. After the introduction of the active charcoal granules 7, the filter fabric 7 is shrunk by heating to thereby produce a flat filter fabric surface again. The filter fabric 7 can also be applied to the cell frame 2 with the partition walls 3 or 4 in such a way that it is bulged by the filling with the active charcoal granules 7 and can thereafter be shrunk as described above.

Figure 4:
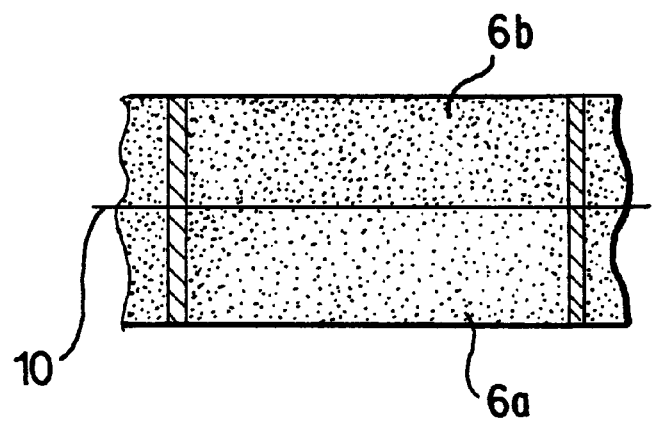
FIG. 4 is a section through a filter chamber with layers of granules.

In the embodiment according to FIG. 4, layers 6a and 6b of active carbon granules having different compositions and different grain sizes are arranged in the filter chambers 5. The layers 6a and 6b are separated from one another by additional layers of sieve fabric, so that the medium to be filtered will flow through the layers one after the other.

We claim:

1. A filter arrangement comprising a cell structure comprising an outer frame and a plurality of intermediate partition walls disposed within the cell frame at right angles to define a plurality of rectangular filter chambers extending in a flow direction of a medium which is to be filtered; first and second filter fabric layers arranged respectively on opposite end faces of the cell structure so as to close off both ends of the filter chambers, a filling comprised at least predominantly of active charcoal granules disposed in said filter chambers between the first and second filter fabric layers, and reinforcing elements for mechanically stabilizing the active charcoal granules disposed in the filter chambers, said reinforcing elements being secured to a layer of said filter fabric by a pin or rivet which passes through the filter fabric layer.

2. A filter arrangement according to claim 1, wherein the filling in the filter chambers comprises a mixture of active charcoal granules having different compositions and a substantially uniform particle size.

3. A filter arrangement according to claim 1, wherein the filling in the filter chambers comprises a plurality of layers of active charcoal granules having different compositions and unequal grain sizes, adjacent layers of granules being separated from each other by an interposed further filter fabric layer, whereby a medium to be filtered must flow through the layers of active charcoal granules one after the other.

4. A filter arrangement according to claim 1, wherein the cell frame and the partition walls are made of a synthetic resin that can be softened or melted by the application of heat, and the respective first and second filter fabric layers are pressed into softened or melted surfaces of the cell frame and partitions to bond the fabric layers to the frame and partitions.

5. A filter arrangement according to claim 4, wherein the first filter fabric layer is pressed into softened or melted surfaces on one end of the frame and partitions and bonded thereto prior to filling the active charcoal granules into the filter chambers.

6. A filter arrangement according to claim 1, wherein the cell frame and the partition walls are injection molded onto the first filter fabric layer.

7. A filter arrangement according to claim 1, wherein the filter fabric layers are made from a polyester sieve fabric.

8. A filter arrangement according to claim 1, wherein at least one of said first and second filter fabric layers is applied bulged onto the cell and frame and intermediate partitions, and after introduction of the active charcoal granules into the filter chamber, the bulged layer is shrunk to produce a flat filter surface, whereby the granules in the filter chamber are compressed.

9. A filter arrangement according to claim 1, wherein after the first filter fabric layer is affixed to the cell frame and intermediate partitions, said first fabric layer is bulged by filling the filter cells with active charcoal granules, after which the second fabric layer is affixed to the opposite end face of the cell frame and intermediate partitions, and the bulged layer is then shrunk to produce a flat filter surface, whereby the granules in the filter chamber are compressed.

10. A filter arrangement according to claim 1, wherein each filter chamber has a square cross section defining a passage area of about 400 mm$^2$ for a flow of a medium to be filtered.

11. A filter arrangement according to claim 1, wherein said active charcoal granules are mixed with pieces of resilient synthetic resin.

12. A filter arrangement according to claim 11, wherein said pieces of resilient synthetic resin are pieces of resilient polyurethane resin foam.

13. A filter arrangement according to claim 1, wherein the active charcoal granules are impregnated with an impregnating agent.

14. A filter arrangement according to claim 1, wherein said reinforcing elements are supported between at least two opposite walls or corners and comprising a tension anchor, said anchor being supported by a cross element on the bottom of the filter chamber.

15. A filter arrangement according to claim 14, wherein said reinforcing element comprises a tension anchor, said anchor being supported by a cross element on the bottom of the filter chamber.

16. A filter arrangement according to claim 1, further comprising a gasket adhesively attached to an outer margin of said cell frame on at least one side thereof.

* * * * *